(12) United States Patent
Askestad

(10) Patent No.: US 10,228,018 B2
(45) Date of Patent: Mar. 12, 2019

(54) BEARING ARRANGEMENT

(71) Applicant: National Oilwell Varco Norway AS, Kristiansand S (NO)

(72) Inventor: Sigmund Askestad, Tvedestrand (NO)

(73) Assignee: National Oilwell Varco Norway AS (NO)

( * ) Notice: Subject to any disclaimer, the term of this patent is extended or adjusted under 35 U.S.C. 154(b) by 0 days.

(21) Appl. No.: 15/739,329

(22) PCT Filed: Jul. 6, 2016

(86) PCT No.: PCT/NO2016/050153
§ 371 (c)(1),
(2) Date: Dec. 22, 2017

(87) PCT Pub. No.: WO2017/007337
PCT Pub. Date: Jan. 12, 2017

(65) Prior Publication Data
US 2018/0172069 A1    Jun. 21, 2018

(30) Foreign Application Priority Data
Jul. 8, 2015   (EP) .................................... 15175856

(51) Int. Cl.
*F16C 21/00*      (2006.01)
*B63B 21/50*      (2006.01)
(Continued)

(52) U.S. Cl.
CPC ............ *F16C 21/00* (2013.01); *B63B 21/507* (2013.01); *F16C 23/08* (2013.01); *F16C 39/02* (2013.01); *F16C 2300/14* (2013.01)

(58) Field of Classification Search
CPC .......... F16C 21/00; F16C 31/00; F16C 31/04; F16C 2300/14
See application file for complete search history.

(56) References Cited

U.S. PATENT DOCUMENTS 1,622,880 A * 3/1927 Perkins ................... F16C 19/08
384/512
2006/0104553 A1* 5/2006 Faust ...................... F16C 29/04
384/49

FOREIGN PATENT DOCUMENTS

DE          1605082        1/1971
DE        202009009806     9/2009
(Continued)

OTHER PUBLICATIONS

Written Opinion for PCT/NO2016/050153 dated Sep. 27, 2016 (4 pages).
(Continued)

*Primary Examiner* — Thomas R Hannon
(74) *Attorney, Agent, or Firm* — Conley Rose, P.C.

(57) ABSTRACT

Disclosed is a bearing arrangement for a bearing wheel in a turret, the bearing arrangement being providable between the bearing wheel and a wheel shaft around which the bearing wheel is rotatably connectable. The bearing arrangement includes a slide bearing enabling the bearing wheel to slide axially on the shaft. The bearing arrangement further includes a roller bearing. A plurality of bearing arrangements may form a bearing system that is employed in a turret of a vessel.
A method for mounting a bearing arrangement in a bearing system is also disclosed.

16 Claims, 7 Drawing Sheets

(51) Int. Cl.
*F16C 39/02* (2006.01)
*F16C 23/08* (2006.01)

(56) References Cited

FOREIGN PATENT DOCUMENTS

| | | |
|---|---|---|
| GB | 2286167 | 8/1995 |
| WO | WO0232753 | 4/2002 |
| WO | WO2011115505 | 9/2011 |
| WO | WO2012080983 | 6/2012 |
| WO | WO2014021958 | 2/2014 |
| WO | WO2014126533 | 8/2014 |
| WO | WO2015060720 | 4/2015 |
| WO | WO2017007337 | 1/2017 |

OTHER PUBLICATIONS

Search Report for PCT/NO2016/050153 dated Jan. 21, 2016 (8 Pages).

* cited by examiner

BEARING ARRANGEMENT

CROSS REFERENCE TO RELATED APPLICATIONS

This application is a 35 U.S.C. § 371 national stage application of PCT/NO2016/050153 filed Jul. 6, 2016 and entitled "Bearing Arrangement", and European Patent Application No. 15175856.2 filed Jul. 8, 2015, which are incorporated herein by reference in their entirety for all purposes.

STATEMENT REGARDING FEDERALLY SPONSORED RESEARCH OR DEVELOPMENT

Not applicable.

TECHNOLOGICAL FIELD

None

BACKGROUND

This present disclosure relates to a bearing arrangement. More specifically, the disclosure relates to a bearing arrangement for a bearing wheel in a turret, such as a bearing arrangement that may be disposed between the wheel and a wheel shaft around which the wheel is rotatably connectable, wherein said bearing arrangement comprises a slide bearing enabling the wheel to slide axially on the shaft.

WO 2011/115505 discloses a device for a rotating turntable comprising a turret and a turntable bearing for a drilling or production vessel for recovery of oil offshore, the turret being rotatable in a through-going opening or a well in the hull of the vessel. The turntable bearing there disclosed includes a number of axial and radial wheels arranged in polar arrays around a centre line of the turret, the axial and radial wheels being connected to wheel shafts and adapted to roll on respective edges of a circular rail. The circular rail is a part of a support structure for the turntable/turret bearing on the vessel. The axial wheels are connected to their respective wheel shafts via slide bearings, the arrangement enabling the wheels to slide axially over slidable surfaces/liners on the wheel shafts.

WO 2011/115505 is hereby incorporated herein by reference.

Tests have shown that if the turntable bearing disclosed in WO 2011/115505 is subjected to significant loads, such as in deep waters where the turret mooring assemblies become very heavy, the wheels of the turntable bearing are subject to excessive loads restraining their rotation around the wheels shafts. Highly restrained rotation may lead to excessive loads on the turret bearing system and further to insufficient weathervaning of the vessel in which the turret is placed causing reduced operating performance of the vessel and additional strain in both the turret structure and in the mooring and riser systems. The vessel will typically be a loading buoy or a ship as used in the production of hydrocarbons.

SUMMARY OF THE DISCLOSURE

The disclosure has for its object to remedy or to reduce at least one of the drawbacks of the prior art, or at least provide a useful alternative to prior art.

The object is achieved through features, which are specified in the description below and in the claims that follow.

In a first aspect, the disclosure is related to a bearing arrangement for a bearing wheel in a turret, said bearing arrangement being providable between the wheel and a wheel shaft to which the wheel is rotatably connectable, wherein said bearing arrangement comprises a slide bearing enabling said wheel to slide axially on said shaft, wherein said bearing arrangement further comprises two bearings provided with an axial distance therebetween and an insert hub for supporting and/or connecting said slide bearing and said rollers bearings between said bearing wheel and said wheel shaft.

The axial distance between the roller bearings are preferably substantially fixed during use. The insert hub may assist in keeping the bearings at a fixed position relative to each other. It should also be noted that the bearing arrangement is not limited for use in bearing wheels in turrets, but that it may also be suitable for use in other rotatable offshore structures, such as in large cranes.

In the following, "axial" shall be defined as the direction along the longitudinal axis of the wheel shaft, which is in contrast to the definition used in WO 2011/115505, where the direction along the wheel shaft is defined as radial/horizontal, while axial is used to define axial direction of the turret.

The arrangement disclosed herein addresses the above-mentioned problem by further including a roller bearing in said bearing arrangement, the roller bearing significantly reducing the rolling friction of the bearing wheel in the rotatable offshore structure. It should be noted that the bearing arrangement is providable between a wheel and its shaft, wherein the wheel and shaft further are a part of a larger bearing system between two parts of an offshore structure between which there may be a relative rotation. As described in WO 2011/115505, the bearing wheel itself is part of a bearing system in a turntable of a turret, hence the name used herein; "bearing wheel".

It should also be noted that the bearing arrangement according to the present disclosure should not be construed as limited to use in turrets and turntables only, and that it may be useful in any situation where there is a need to support a revolving load relative to a fixed structure primarily offshore.

By using more than one roller bearing, the qualities of different types of roller bearings may be combined so as to optimize the performance of the bearing arrangement as will be described below. It should also be appreciated that the bearing arrangement may comprise any number of roller bearings, including more than two. The bearing arrangement may also comprise more than one slide bearing. In a preferred embodiment, the bearing arrangement may comprise two slide bearings. It may be beneficial with two smaller slide bearing than one long, for instance extending over the full length of the wheel and/or of an insert hub as will be discussed below. This is due to the fact that the shaft itself may be flexible and bending during use, and to increase stability one slide bearing at each end may be beneficial. The bearing size may preferably be kept at moderate level to ensure a certain bearing pressure to activate a lubricant typically enclosed in bearing liners on the shaft. The friction coefficient typically declines with increased pressure up to a certain level. A further advantage of using two roller bearings with a substantial distance therebetween is to keep the wheel stable with regard to overturning effects from axial loads arising as a consequence of imposed external motion. A person skilled in the art will be aware that the common practice in two bearing applications is to anchor one of the bearings to handle the axial (thrust) loads and allow the other bearing to slide between the inner bearing raceway ring and the shaft for absorbing axial deformations caused by thermal and load effects.

In one embodiment, the bearing arrangement may comprise a spherical roller bearing. A spherical roller bearing may provide the wanted reduction in rotational friction between the wheel and the wheel shaft, while at the same being able to take up axial loads, which may be particularly desirable in the turret arrangement described in WO 2011/115505 where the axial wheel preferably should have the possibility of sliding in the order of 10 mm axially. As will be known to a person skilled in the art, spherical roller bearings combine low friction with a possibility of some misalignment between the inner and the outer ring. The outer ring typically has a spherical inner surface, while the rolling elements typically are mainly cylindrical in shape, with a profile that makes them appear like cylinders that have been slightly over-inflated. Spherical roller bearings may also require less tight production tolerances as well as less precise pre-tensioning of the bearing rings compared to other types of roller bearings, and particularly compared to tapered roller bearings.

In addition, or as an alternative, said bearing arrangement may comprise a cylindrical roller bearing. A cylindrical roller bearing may provide the desired reduction in rotational friction of the wheel relative to the wheel shaft while at the same time being able to take up significant vertical loads. The use of only cylindrical rollers bearings may be undesirable due to the lack of or reduced capability of taking up axial loads. In a preferred embodiment, the cylindrical roller bearing may be a so-called CARB bearing, such as those available from the company SKF.

In one particularly useful embodiment, the bearing arrangement may comprise one cylindrical roller bearing and one spherical roller bearing, which may thus combine the qualities of the two different types of roller bearings described above, i.e. reducing rotational friction while at the same time being able to take up both axial and vertical loads. Compared to using tapered roller bearings, as will be described below, cylindrical and spherical roller bearings may be easier to remove and replace. The cylindrical roller bearing may preferably be a CARB bearing as described above.

In one embodiment, the bearing arrangement may comprise, in addition or as an alternative, a tapered roller bearing. A tapered roller bearing may also provide the required reduction in rotational friction. At the same time, tapered roller bearings have the advantage that they may take up both axial and vertical loads. As such, tapered roller bearing could be assumed to be the natural choice for reducing the rotational friction. However, it has been found that it may be cumbersome to remove and replace tapered roller bearings from a bearing arrangement according to the present disclosure, and that the combination of spherical and cylindrical roller bearings described above may be regarded as the preferred option. Tapered roller bearings may still serve as a useful alternative. A person skilled in the art will know that tapered roller bearings are interchangeably being described as conical roller bearings due to the shape of inner and outer rings thereof.

In one embodiment the insert hub may have an inside facing said wheel shaft and an outside facing said wheel in a position of use. The slide bearing(s) may be connected on the inside of said insert hub, and the outside of said insert hub may be adapted to support said roller bearing(s). In an alternative embodiment, the rollers bearing(s) may be connected to the inside of the insert hub while the slide bearings may be provided on the outside. The insert hub may as such significantly simplify combining different types of bearings, and further simplify assembling and disassembling of the bearing arrangement and for mounting and dismounting the bearing arrangement between a wheel and its shaft in a bearing system.

In one embodiment, the bearing arrangement may be provided with locking means for locking said insert hub to the wheel shaft so as to prevent said insert hub from rotating relative to said shaft. This may be beneficial especially during flushing/lubrication of said bearing arrangement, as it may be desirable to keep the inner portion of the bearing assembly at a known position relative to the outer portion of the bearing assembly to ensure correct lubrication. On the other hand, during normal operation, it may be desirable to enable the insert hub to rotate relative to the wheel shaft as a potential back-up for the roller bearing(s). As such, it may be beneficial if the locking means is selectively engageable/dis-engageable. In one embodiment, said locking means may comprise locking bolts connected to one of the shaft and the insert hub and a locking plate or the like for engaging said bolts on the other of said shaft and said insert hub, though a person skilled in the art would be able to come up with numerous ways of rotationally locking the insert hub to the shaft.

In one embodiment, the bearing arrangement may be provided with spacing means between said roller bearings. Such spacing means may be an advantage during mounting and dismounting of the bearing arrangement. During mounting, the spacing means may facilitate a precise placing of the roller bearings, and during dismounting it may be possible to push one roller bearing out by pushing the other one in as the spacing means will transfer the forces between the two roller bearings. Also, the spacing means may simply reduce the volume of required lubrication.

The disclosure also relates to a bearing system for a turret, the bearing system comprising a plurality of bearing arrangements according to the disclosure. There is also described a turret comprising such a bearing system as well as a vessel, such as a loading buoy or a ship, comprising such a turret.

There is also described a method for mounting a bearing assembly according to the disclosure between a bearing wheel and its shaft in a bearing system comprising a plurality of such bearing arrangements. The method comprises the step of assembling different bearings and the wheel as one unit prior to mounting the unit on the shaft.

The method may comprise the step of using an insert hub for connecting the different bearings to the wheel, and preferably the method further comprises the steps of shrink fitting the slide bearing(s) on the inside of the insert hub and shrink fitting an outer ring of the roller bearing(s) on the inside of the wheel. Alternatively, the roller bearings may be shrink-fitted on the inside of the insert hub while the slide bearings may be shrink fitted to the outside of the insert hub. The method described above may be particularly useful when using a combination of spherical roller bearing and a cylindrical roller bearing.

BRIEF DESCRIPTION OF DRAWINGS

The disclosed exemplary embodiments are illustrated in the accompanying drawings, wherein.

DETAILED DESCRIPTION OF THE DISCLOSED EXEMPLARY EMBODIMENTS

Figure 1:
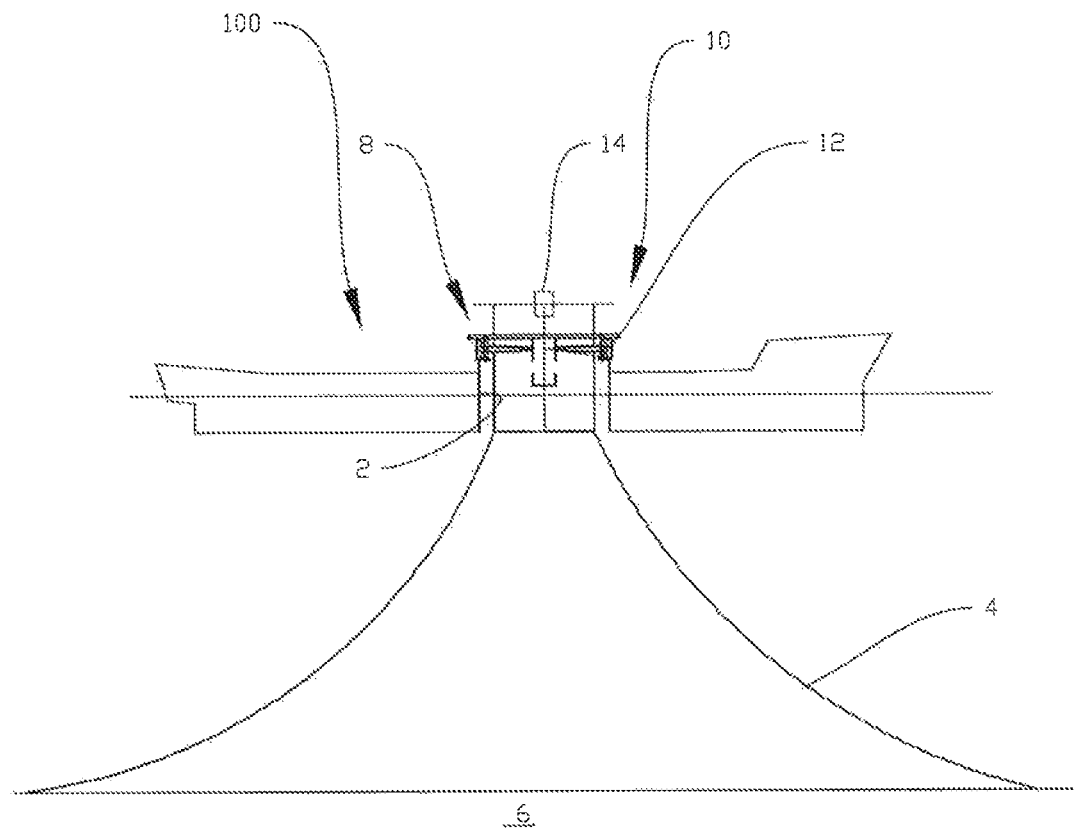
FIG. 1 shows, in a schematic side view, a vessel with a turret through-going in a hole in the vessel.

In the following, the reference numeral 1 will denote a bearing arrangement according to the present disclosure, whereas the reference numerals 10 and 100 denote a turret comprising a plurality of such bearing arrangements 1 and a vessel comprising such a turret, respectively. Identical reference numerals will indicate identical or similar features in the figures. The figures are shown schematically and simplified, and the various features in the figures are not necessarily drawn to scale.

Figure 2:
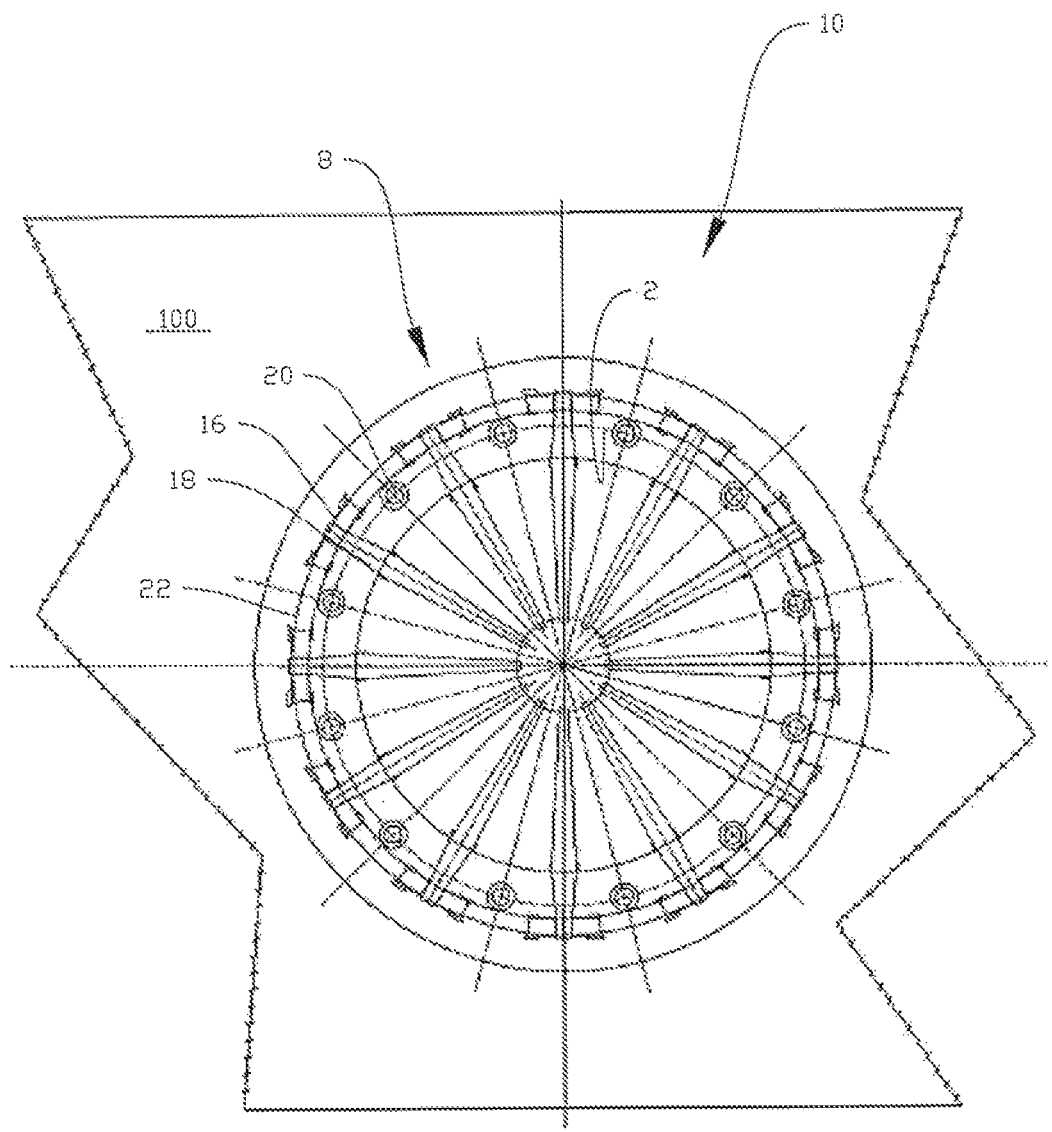
FIG. 2 shows, in a top view and larger scale than on FIG. 1, the turret and its bearing system in the vessel.

FIGS. 1 and 2 can also be found in WO 2011/115505, but are re-presented herein to give a general overview of one possible implementation of a bearing arrangement 1 in a bearing system 8 as used in a turret 10 in a vessel 100.

Reference is first made to FIG. 1 which shows the vessel 100 with the turret 10 mounted in through-going 2 hole in the vessel. Mooring lines 4 extend from a lower portion of the turret 10 and down to a seabed 6. The turret bearing system 8 is mounted onto a support structure 12 on the vessel 100, while a swivel coupling 14 is used for bridging various cables and conduits across to the vessel 100.

FIG. 2 shows the turret 10 and its bearing system 8 as seen from above. Polar arrays of axial bearing wheels 16, suspended on axial shafts 18, and vertical bearing wheels 20, suspended on not shown vertical shafts, roll on horizontal and vertical sides, respectively, of a circular rail 22. The circular rail 22 is a part of the vessel support structure 12. Reference is made to WO 2011/115505 for a more detailed description of the turret 10 employed with a bearing system according to the prior art.

Figure 3:
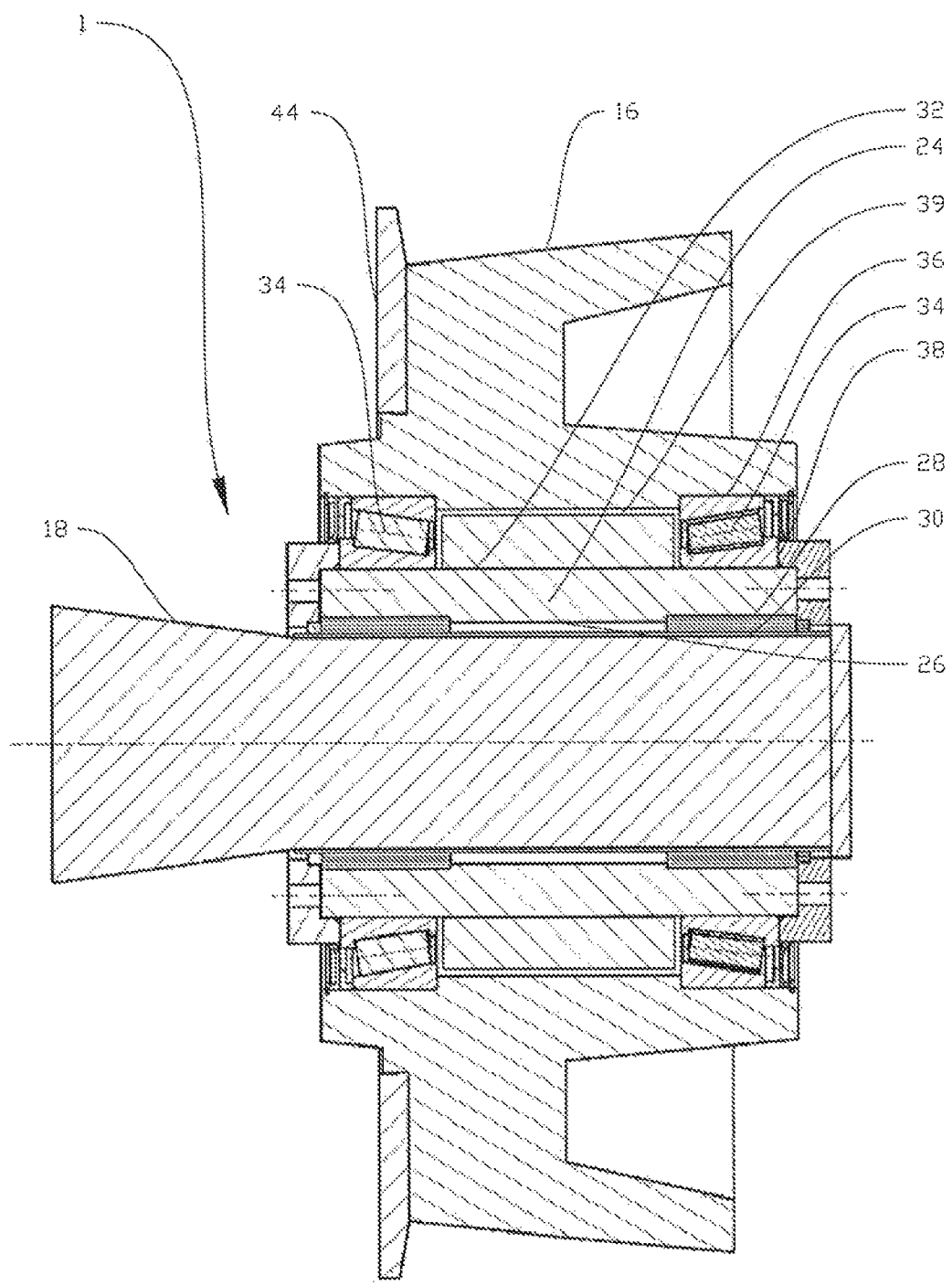
FIG. 3 shows, in a cross-section and larger scale than in FIG. 2, a bearing arrangement according to the present disclosure.
Figure 4:
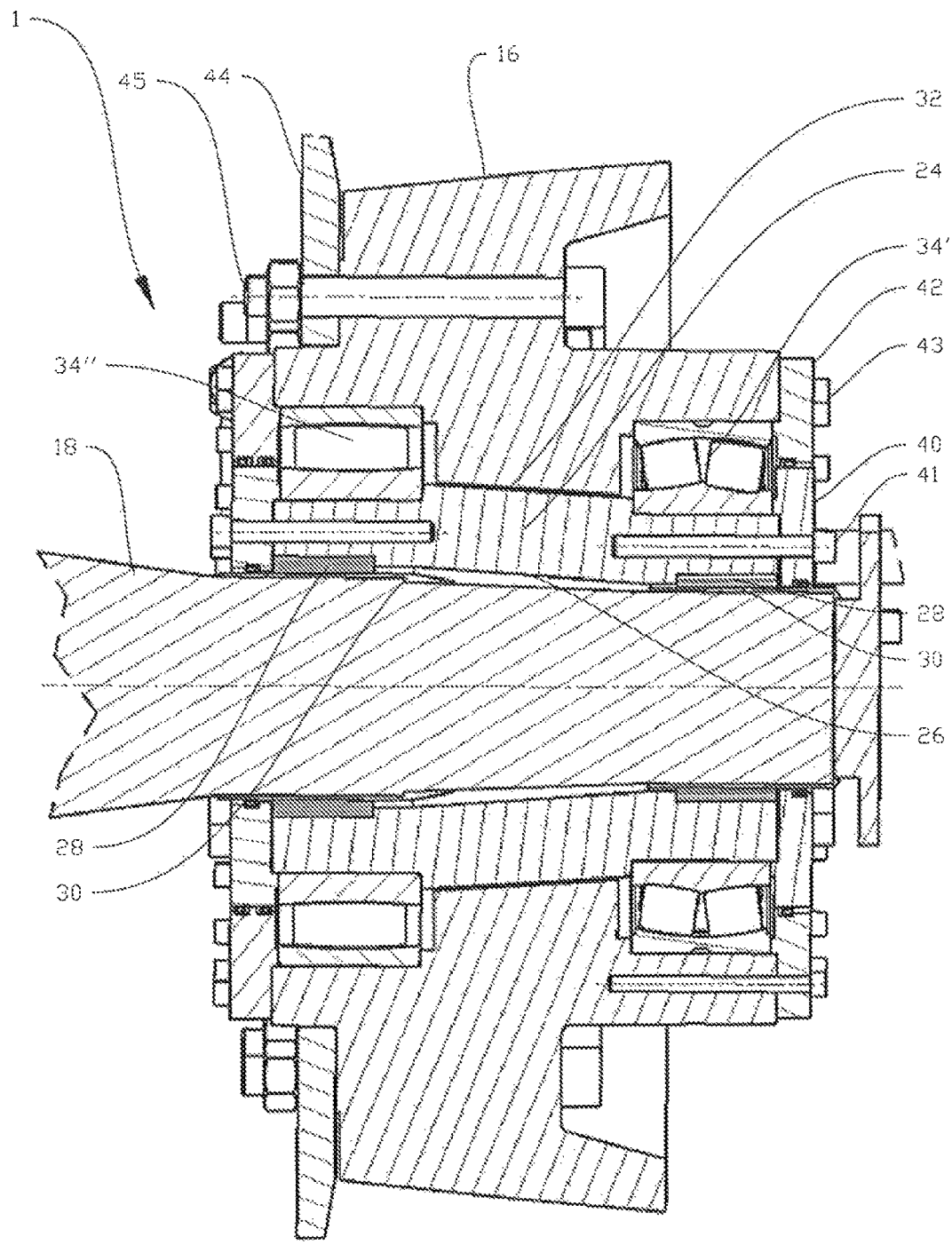
FIG. 4 shows, in a cross-sectional side view, a second embodiment of a bearing arrangement according to the present disclosure.

FIG. 3 shows, in a larger scale, a cross-section of a bearing arrangement 1 according to the present disclosure, as provided between an axial bearing wheel 16 and an axial shaft 18. Hereinafter the axial bearing wheel 16 and axial shaft 18 will simply be described as the wheel and the shaft, respectively. In the shown cross-section, the centre of the polar array would be on the left hand side of the figure. The wheel 16 is conically shaped with a double curved surface as is also described in WO 2011/115505. The bearing arrangement 1 comprises an insert hub 24. On its inside 26 the insert hub 24 is connected to two slide bearings 28 enabling the axial wheel 16 to glide axially on the shaft 18 on a liner 30. The slide bearings 28 are shrink fit into the inside 26 of the insert hub 24 prior to mounting the bearing arrangement 1 onto the shaft 18. The liner 30 is shrink fit to the shaft 18, the liner 30 extending the full axial length of the insert hub 24 in the shown embodiment. On its outside 32, the insert hub 24 supports two roller bearings 34, here shown in the form of tapered roller bearings. An outer ring 36 of each of the roller bearings 34 is fit, with a light interference fit, into the wheel 16 and thus supported radially towards the centre thereof, while a lower ring 38 of each of the roller bearings 34 comes with a light shrink fit towards the insert hub 24. First and second rings, not shown in this figure but discussed below and shown in FIG. 4, are used to pretension the roller bearings 34 so as to provide a desired axial pressure on the roller bearings 34. The wheel 16 and bearing arrangement 1 are assembled into one unit prior to mounting it onto the shaft 18. The bearing arrangement 1 is further provided with spacing means in the form of a spacer 39 provided between the two roller bearings 34. In the shown embodiment, the spacer 39 reduces the necessary lubrication volume during use. A second, and slightly more advanced embodiment of a spacing means 39 will be described with reference to FIG. 6 below.

Figure 5:
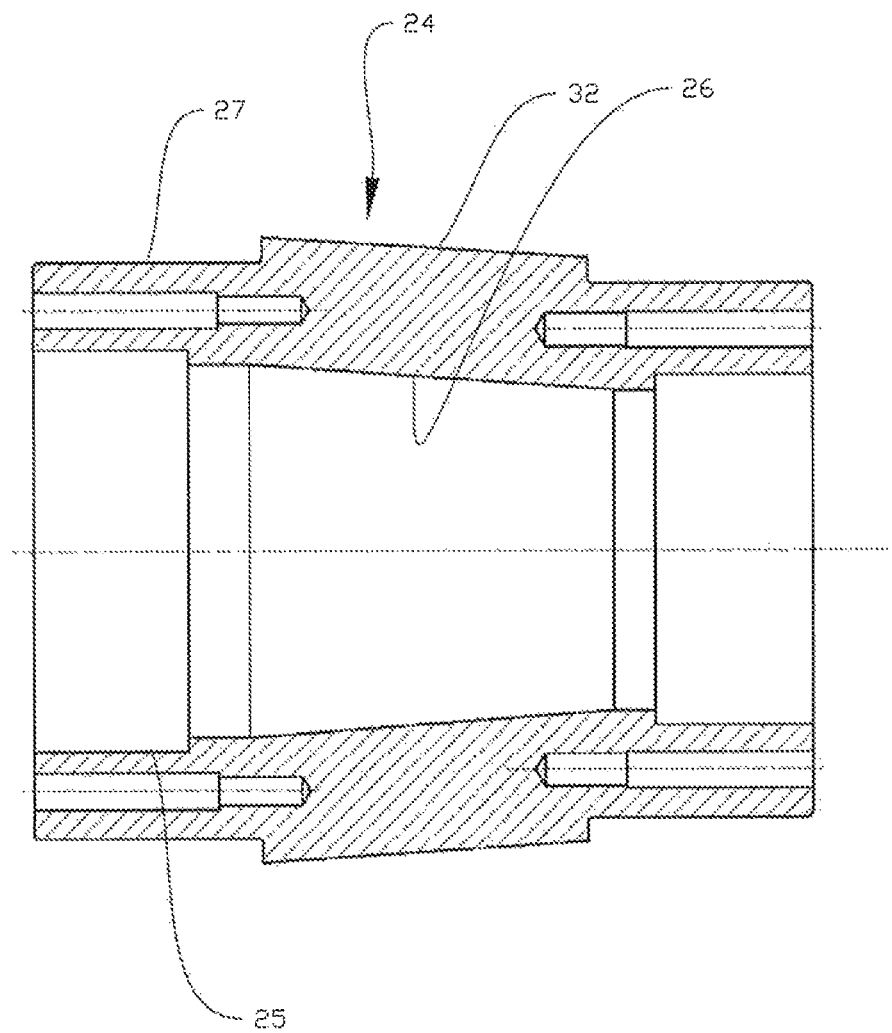
FIG. 5 shows, in a cross-sectional side view, an insert hub as used in the second embodiment of a bearing arrangement according to the present disclosure.

In FIG. 4, a second, and slightly different embodiment of a bearing arrangement 1 according to the present disclosure, is shown. The tapered roller bearings 34 as shown in FIG. 3 have been replaced by a spherical roller bearing 34' and a cylindrical roller bearing 34". The outer rings 36 of the roller bearings 34 are shrink fit into the inside of the wheel 16, while inner rings 38 are supported by the insert hub 24. End portions of the bearing arrangement 1 are closed/covered by means of first rings 40, connected to the insert hub 24 by means of bolts 41, and second rings 42, connected to the wheel 16 by means of bolts 43. The first and second rings 40, 42 are used to pretension the roller bearings 34', 34" in the axial direction. The wheel 16 is further connected to a flange 44 by means of bolts 45. The bearing arrangement 1 also comprises a plurality of seals, such as between the first and second rings 40, 42 and between the first rings 40 and the shaft 18, that will not be discussed in detail herein, though a person skilled in the art will understand that the seals for instance will protect the various bearings from being exposed to dirt from the outside and keep lubricant on the inside. In the shown embodiment, the liner 30 does not extend over the full axial length of the insert hub 24, but is rather provided as two liners 30, one under each slide bearing 28. In addition, both the shaft 18 itself and the inside 26 of the insert hub 24 are complimentary tapered over the axial length of the insert hub 24. The taper in combination with the limited axial extent of the liner 30 may be particularly beneficial during mounting of the bearing arrangement 1, where the limited axial gliding possibility of the insert hub 24 will improve the positioning accuracy on the shaft 18 as well as prevent it from damaging any seal. An alternative could be form the shaft 18 with stepped diameter to ensure positioning accuracy of the liners 30 and the insert hub 24. The embodiment of FIG. 4 is shown without any spacing means. The insert hub 24 from FIG. 4 is shown isolated in FIG. 5, where it can be seen that the insert hub 24 is formed with two recesses 25 on its inside 26 for accommodating two slide bearings, not shown in the figure, and two recesses 27 on its outside 32 for accommodating two roller bearings, also not shown in the figure.

Figure 6:
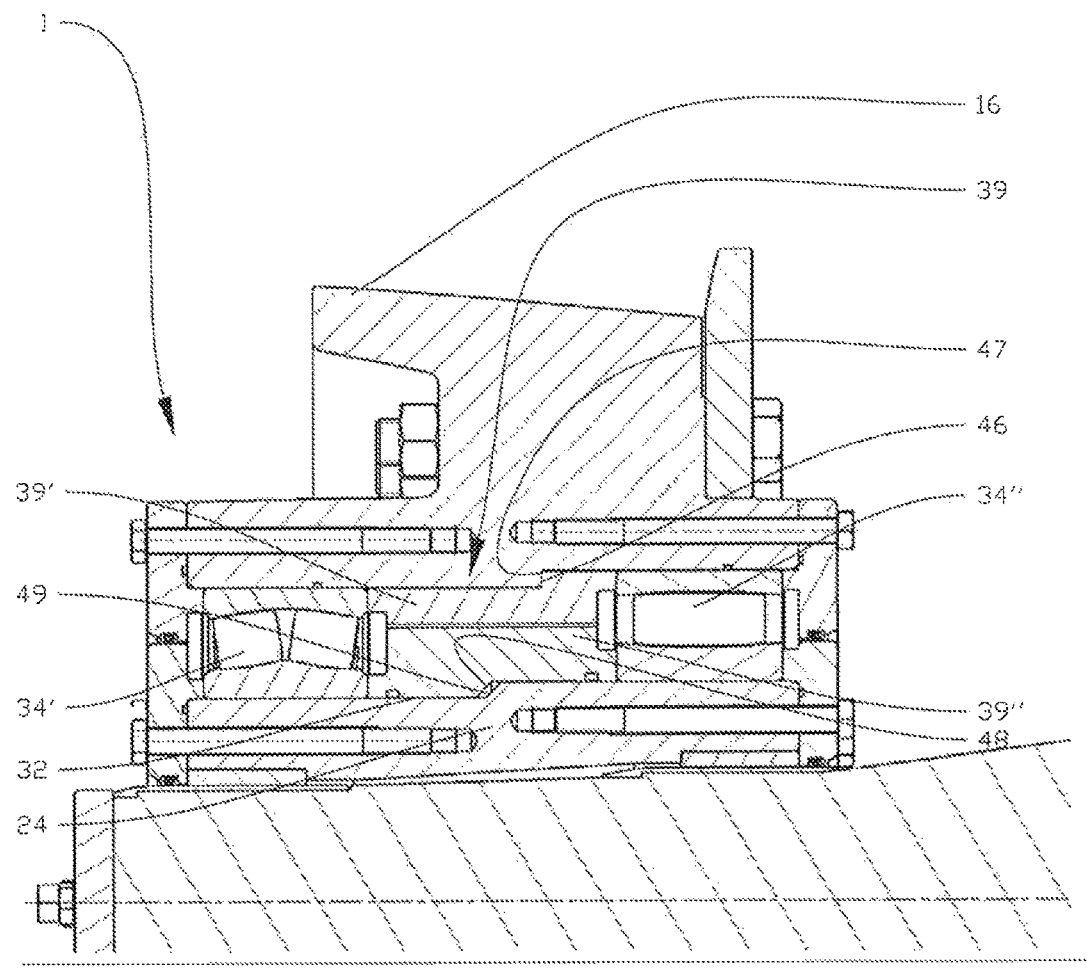
FIG. 6 shows, in a cross-sectional side view, a part of a third embodiment of bearing arrangement according to the present disclosure.

A third embodiment of a bearing arrangement 1 according to the disclosure is shown in FIG. 6 in a slightly larger scale. Only an upper portion of the bearing arrangement 1 is shown, and it should be noted that the radial centre of the turret 10 would be on the right hand side of the drawing in the shown embodiment. In the shown embodiment, the spacing means 39 comprises two portions 39' 39". An upper portion 39' is formed with a vertical engagement portion 46 complimentary fitting to a parapet 47 on the inside of the wheel 16. Similarly, a lower portion 39" of the spacing means 39 is formed with an inclined surface 48 complimentary fitting to an inclined surface 49 on the outer surface 32 of the insert hub 24. In the shown geometric configuration of the spacing means 39', 39", the inside of the wheel 16 and outside 32 the insert hub 24 facilitates correct placing of the roller bearings 34', 34" with respect to each other and the rest of the bearing arrangement 1 as well as the wheel 16 upon mounting. Further, the shown configuration simplifies removal of the roller bearings 34', 34" upon dismounting and replacement of the roller bearings 34', 34" as the spacers 39' can be used to push out the cylindrical roller bearing 34". Finally, the spacers 39', 39" also reduce the necessary lubrication volume during use.

Figure 7:
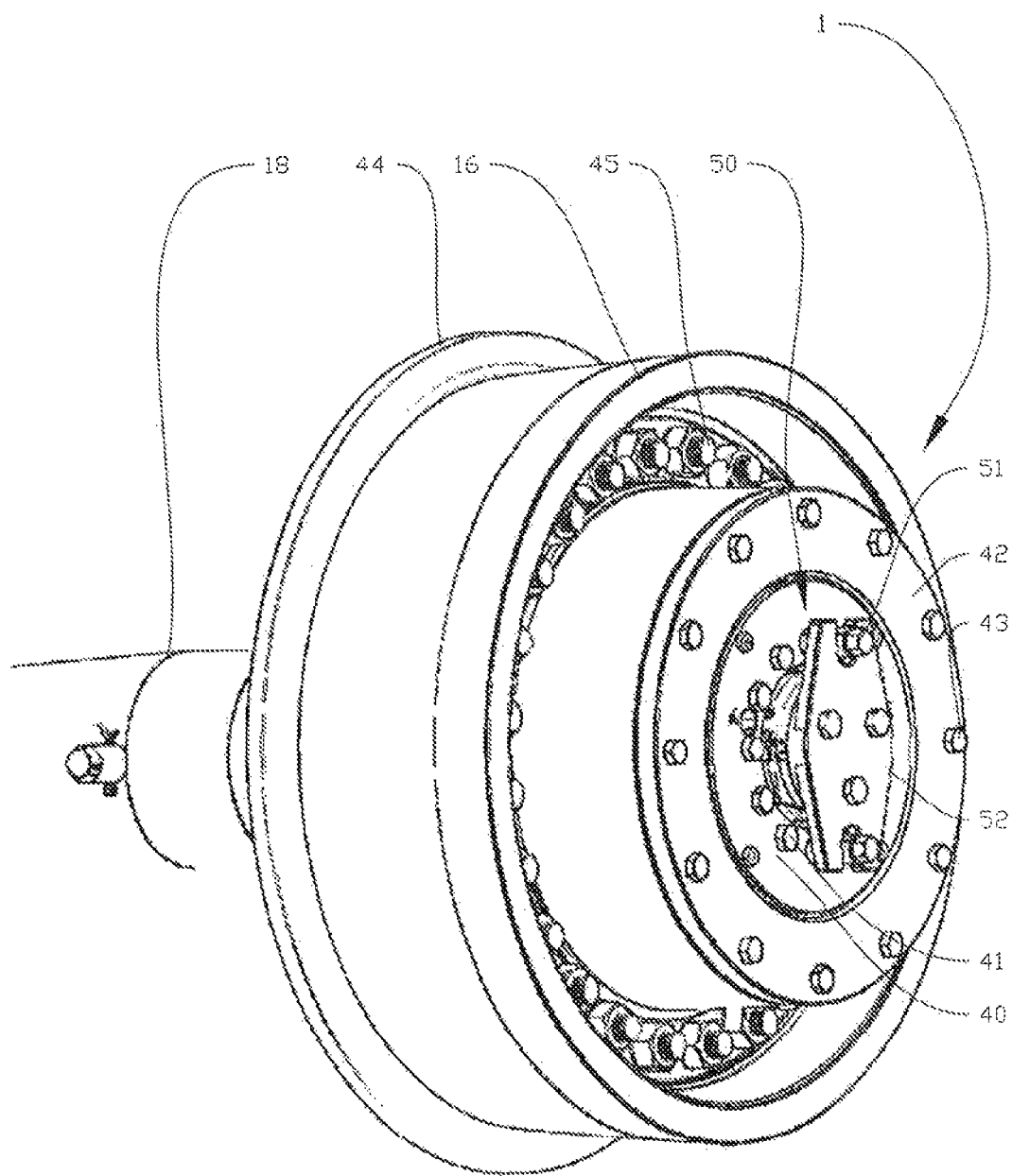
FIG. 7 shows, in a perspective end view, a wheel connected to a wheel shaft via a bearing arrangement according to the present disclosure.

FIG. 7 shows a perspective end view of a wheel 16 mounted onto a shaft 18 via a bearing arrangement 1. It can also be seen that the bearing arrangement 1 is provided with a locking means 50 in the form of two bolts 51 being engaged by a double fork-like plate 52, the fork-like plate 52 being connected to the shaft 18 and the bolts 51 being connected to the insert hub, which is not directly shown on the figure, via the inner ring 40. The insert hub is thus prevented from rotating relative to the shaft 18, the reason for which was discussed above. The bolts 51 can easily be removed, thus enabling the insert hub 24 to rotate relative to the shaft 18, which may serve as a useful back-up for the roller bearings in case they should be damaged or overloaded. The bolts 41 for connecting the inner ring 40 to the insert hub 24, the outer ring 42, the bolts 43 for connecting the outer ring 42 to the wheel 16, the flange 44 and the bolts 45 for connecting the flange 44 to the wheel 16 can also be seen in their position of use in the figure.

It should be noted that the above-mentioned embodiments illustrate rather than limit the claimed invention, and that those skilled in the art will be able to design many alternative embodiments without departing from the scope of the invention, which is defined by the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A bearing arrangement for a bearing wheel in a turret, said bearing arrangement being providable between the bearing wheel and a wheel shaft around which the bearing wheel is rotatably connectable and comprising:
   a slide bearing enabling said bearing wheel to slide axially on said shaft, said bearing arrangement comprising:
   two roller bearings provided with an axial distance therebetween; and
   an insert hub configured to support and/or connect said slide bearing and said roller bearings between said bearing wheel and said wheel shaft.

2. A bearing arrangement according to claim 1, wherein said bearing arrangement comprises a spherical roller bearing.

3. A bearing arrangement according to claim 2, wherein said bearing arrangement is provided with spacing means arranged between said roller bearings.

4. A bearing arrangement according to claim 1, wherein said bearing arrangement comprises a cylindrical roller bearing.

5. A bearing arrangement according to claim 1, wherein said bearing arrangement comprises one cylindrical roller bearing and one spherical roller bearing.

6. A bearing arrangement according to claim 1, wherein said bearing arrangement comprises a tapered roller bearing.

7. A bearing arrangement according to claim 1, wherein the slide bearing is connected on the inside of said insert hub, and wherein the outside of said insert hub is adapted to support said roller bearing(s).

8. A bearing arrangement according to claim 1, wherein said insert hub is formed with recesses for accommodating said slide bearing(s) and roller bearings.

9. A bearing arrangement according to claim 8, wherein said bearing arrangement is provided with locking means for locking said insert hub so as to prevent said insert hub from rotating relative to said shaft.

10. A bearing arrangement according to claim 9, wherein said locking means is selectively engageable.

11. A bearing system for a turret comprising a plurality of bearing arrangements according to claim 1.

12. A turret comprising a bearing system according to claim 11.

13. A vessel comprising a turret according to claim 12.

14. A method for mounting a bearing arrangement according claim 1 between a bearing wheel and a shaft in a bearing system comprising a plurality of such bearing arrangements, the method comprising:
    assembling the bearing arrangement and the wheel as one unit prior to mounting the unit onto the shaft.

15. A method according to claim 14, wherein the method further comprises:
    using an insert hub for connecting and/or supporting the bearings of the bearing arrangement between the bearing wheel and the shaft.

16. A method according to claim 15, wherein the method further comprises:
    shrink fitting at least one of the slide bearing and roller bearings to the inside of the wheel; and
    shrink fitting the other one of the slide bearing and the roller bearings to the inside of the insert hub.

* * * * *